United States Patent
Wang et al.

(10) Patent No.: US 10,877,500 B2
(45) Date of Patent: Dec. 29, 2020

(54) DIGITALLY-ASSISTED DYNAMIC MULTI-MODE POWER SUPPLY CIRCUIT

(71) Applicant: QUALCOMM Incorporated, San Diego, CA (US)

(72) Inventors: Yikai Wang, San Diego, CA (US); Sivaprasad Embanath, Singapore (SG); Joseph Dale Rutkowski, Chandler, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/554,082

(22) Filed: Aug. 28, 2019

(65) Prior Publication Data
US 2020/0073425 A1  Mar. 5, 2020

Related U.S. Application Data

(60) Provisional application No. 62/725,033, filed on Aug. 30, 2018.

(51) Int. Cl.
*G05F 1/575* (2006.01)
*G05F 1/565* (2006.01)

(52) U.S. Cl.
CPC .............. *G05F 1/575* (2013.01); *G05F 1/565* (2013.01)

(58) Field of Classification Search
CPC ............. G05F 1/56; G05F 1/565; G05F 1/575
See application file for complete search history.

(56) References Cited

U.S. PATENT DOCUMENTS

| 2004/0251854 | A1* | 12/2004 | Matsuda ............... H05B 45/37 315/291 |
| 2009/0219004 | A1 | 9/2009 | Hirano |
| 2013/0043828 | A1* | 2/2013 | Gurlahosur ......... H02J 7/00718 320/107 |
| 2014/0167719 | A1 | 6/2014 | Chu |
| 2015/0102789 | A1* | 4/2015 | Kobayashi ............. G05F 1/468 323/271 |
| 2015/0362550 | A1* | 12/2015 | Wibben ................ G01R 31/50 324/750.3 |
| 2016/0358526 | A1* | 12/2016 | Wang .................... G09G 3/3208 |
| 2017/0222554 | A1 | 8/2017 | Jatavallabhula et al. |
| 2018/0262188 | A1* | 9/2018 | Roy .................... H03K 17/0822 |

OTHER PUBLICATIONS

International Search Report and Written Opinion—PCT/US2019/048729—ISA/EPO—dated Nov. 25, 2019.

* cited by examiner

*Primary Examiner* — Jue Zhang
*Assistant Examiner* — Trinh Q Dang
(74) *Attorney, Agent, or Firm* — Patterson & Sheridan, LLP

(57) ABSTRACT

Certain aspects of the present disclosure generally relate to methods and apparatus for switching between modes of a multi-mode power supply circuit. One example power supply circuit generally includes a switched-mode power supply (SMPS) circuit, a voltage regulator circuit having an input coupled to an output of the SMPS circuit, the voltage regulator circuit being configured to be selectively enabled, a first voltage divider selectively coupled to the output of the SMPS circuit and selectively coupled to an output of the voltage regulator circuit, and a second voltage divider coupled to the output of the voltage regulator circuit.

27 Claims, 9 Drawing Sheets

DIGITALLY-ASSISTED DYNAMIC MULTI-MODE POWER SUPPLY CIRCUIT

CROSS-REFERENCE TO RELATED APPLICATION

This application claims benefit of U.S. Provisional Patent Application Ser. No. 62/725,033, entitled "Digitally-Assisted Dynamic Multi-Mode Power Supply Circuit" and filed Aug. 30, 2018, which is herein incorporated by reference in its entirety.

TECHNICAL FIELD

Certain aspects of the present disclosure generally relate to electronic circuits and, more particularly, to a multi-mode power supply circuit and operation thereof.

BACKGROUND

Power management integrated circuits (power management ICs or PMICs) are used for managing the power demands of a host system. A PMIC may be used in battery-operated devices, such as mobile phones, tablets, laptops, wearables, etc., to control the flow and direction of electrical power in the devices. The PMIC may perform a variety of functions for the device such as DC-to-DC conversion (e.g., using a voltage regulator), battery charging, power-source selection, voltage scaling, power sequencing, etc.

A voltage regulator ideally provides a constant direct current (DC) output voltage regardless of changes in load current or input voltage. Voltage regulators may be classified as either linear regulators or switching regulators. While linear regulators tend to be small and compact, many applications may benefit from the increased efficiency of a switching regulator. A linear regulator may be implemented by a low-dropout (LDO) regulator, for example. A switching regulator may be implemented, for example, by a switched-mode power supply (SMPS), such as a buck converter or a boost converter. While a buck converter (also known as a step-down converter) converts a higher input voltage to a lower output voltage, a boost converter (also known as a step-up converter) converts a lower input voltage to a higher output voltage.

SUMMARY

Certain aspects of the present disclosure generally relate to techniques and apparatus for switching between different operational modes of a multi-mode power supply circuit.

Certain aspects of the present disclosure provide a power supply circuit. The power supply circuit generally includes a switched-mode power supply (SMPS) circuit, a voltage regulator circuit having an input coupled to an output of the SMPS circuit, the voltage regulator circuit being configured to be selectively enabled, a first voltage divider selectively coupled to at least one of the output of the SMPS circuit or the input of the voltage regulator circuit and selectively coupled to an output of the voltage regulator circuit, and a second voltage divider coupled to the output of the voltage regulator circuit.

Certain aspects of the present disclosure provide a method of operating a multi-mode power supply circuit. The method generally includes detecting a high input voltage event in the multi-mode power supply circuit comprising a SMPS circuit having an output coupled to an input of a voltage regulator circuit; enabling the voltage regulator circuit based on the detection; temporarily increasing a regulation point of the voltage regulator circuit to be higher than an input voltage at the input of the voltage regulator circuit; and decreasing the regulation point of the voltage regulator circuit after a delay.

Certain aspects of the present disclosure provide an apparatus for supplying power via multiple modes. The apparatus generally includes means for supplying power via switching regulation; means for regulating a voltage from the means for supplying power; means for detecting a high input voltage event in the apparatus; means for enabling the means for regulating the voltage, based on the detection; means for temporarily increasing a regulation point of the means for regulating the voltage to be higher than the voltage from the means for supplying power; and means for decreasing the regulation point of the means for regulating the voltage, after a delay.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

An Example Device

Figure 1:
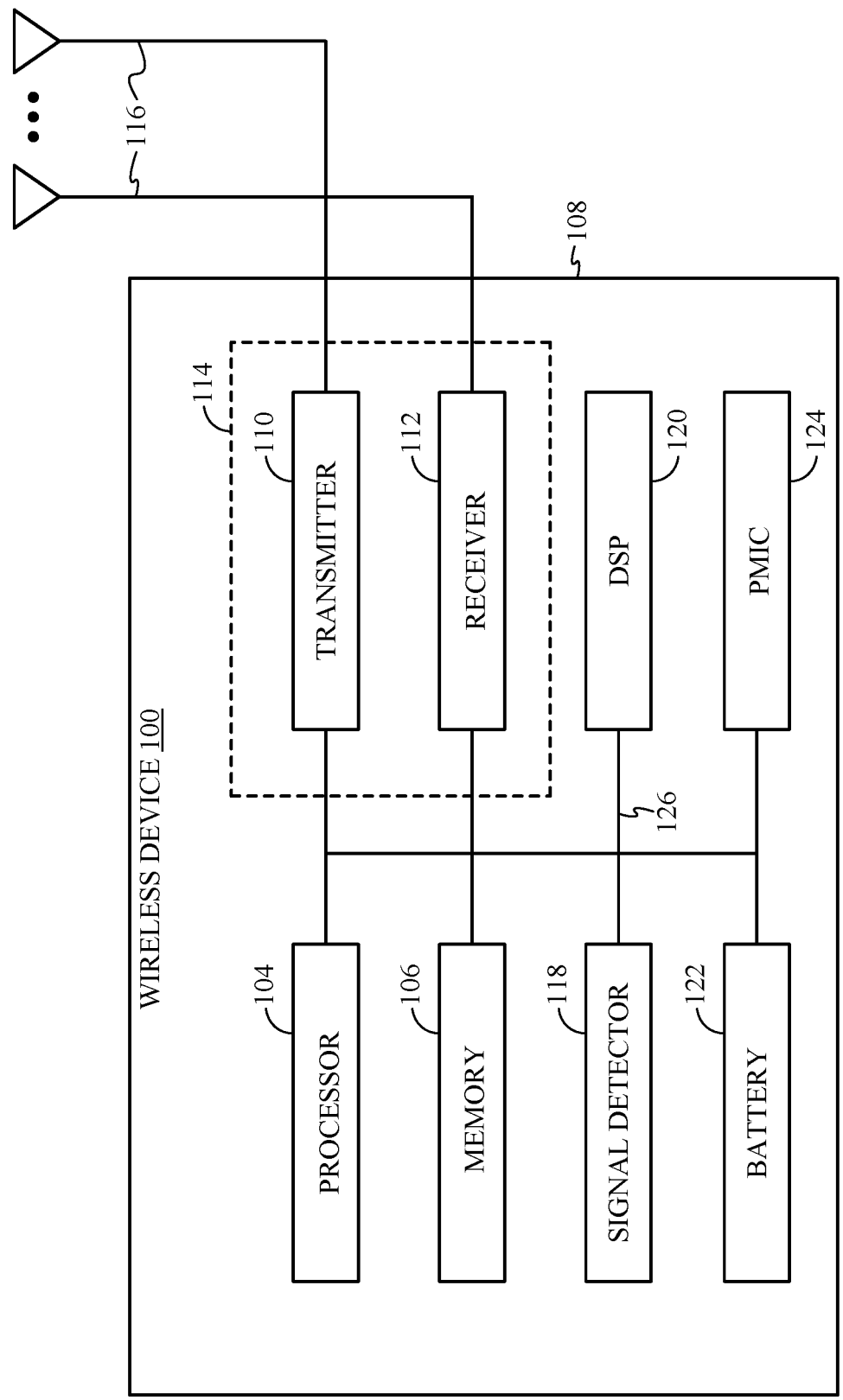
FIG. 1 illustrates a block diagram of an example device that may include a multi-mode power supply circuit, in accordance with certain aspects of the present disclosure.

FIG. 1 illustrates an example device 100 in which aspects of the present disclosure may be implemented. The device 100 may be a battery-operated device such as a cellular phone, a personal digital assistant (PDA), a handheld device, a wireless device, a laptop computer, a tablet, a smartphone, etc.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106.

In certain aspects, the device 100 may also include a housing 108 that may include a transmitter 110 and a receiver 112 to allow transmission and reception of data between the device 100 and a remote location. For certain aspects, the transmitter 110 and receiver 112 may be combined into a transceiver 114. One or more antennas 116 may be attached or otherwise coupled to the housing 108 and electrically connected to the transceiver 114. The device 100 may also include (not shown) multiple transmitters, multiple receivers, and/or multiple transceivers.

The device 100 may also include a signal detector 118 that may be used in an effort to detect and quantify the level of signals received by the transceiver 114. The signal detector 118 may detect such signal parameters as total energy, energy per subcarrier per symbol, and power spectral density, among others. The device 100 may also include a digital signal processor (DSP) 120 for use in processing digital signals.

The device 100 may further include a battery 122 used to power the various components of the device 100. The device 100 may also include a power management integrated circuit (power management IC or PMIC) 124 for managing the power from the battery to the various components of the device 100. The PMIC 124 may perform a variety of functions for the device such as DC-to-DC conversion, battery charging, power-source selection, voltage scaling, power sequencing, etc. In certain aspects, the PMIC 124 may include a battery charging circuit (e.g., a master-slave battery charging circuit) or other switched-mode power supply (SMPS). For certain aspects, the battery charging circuit or other switched-mode power supply may include a multi-mode power supply circuit, as described below. The various components of the device 100 may be coupled together by a bus system 126, which may include a power bus, a control signal bus, and/or a status signal bus in addition to a data bus.

Example Multi-Mode Power Supply Circuit

Power supply circuits used in certain electronic devices, such as smartphones, tablets, and other portable devices, may be designed to meet stringent line transient performance specifications. For example, a display (e.g., an active matrix organic light-emitting diode (AMOLED) panel) may be very sensitive to the stability of a voltage supply rail, where any voltage disturbance above 20 $mV_{pp}$ and lasting over 30 to 100 µs may cause screen-banding behavior. However, an input voltage rail (e.g., VPH_PWR output by a battery charging circuit, such as in the PMIC 124) may suffer a large load attack or release, thereby causing significant undershoot or overshoot (e.g., up to 750 mV). Furthermore, with a battery charger (also referred to as a power adapter) plugged into an electrical outlet, the DC value of VPH_PWR may be increased as high as 4.8 V, which may be higher than a desired converter output voltage of 4.6 V.

One solution involves utilizing a post regulator stage after the converter stage, which can relax the converter design specifications. However, having a constantly enabled post regulator may result in an efficiency drop (e.g., a drop of about 2~3%). Another solution entails enabling a post regulator when desired (referred to as normal power mode) and keeping the post regulator in bypass mode at other times. In bypass mode (BYP), the post regulator is effectively bypassed, such as by short-circuiting the post regulator with a closed switch. Still, the transition from bypass mode to normal power mode (NPM) and vice versa may introduce undesired large voltage disturbances.

Certain aspects of the present disclosure provide a digitally assisted dynamic multi-mode power supply circuit. The multi-mode power supply circuit may provide high power supply rejection ratio (PSRR) regulation and may accommodate high input voltage level (e.g., high VPH_PWR) events. Based on the detected input power supply voltage condition (e.g., large noise/ripple and/or high voltage level) a digital controller may automatically enable or disable the post regulator and adjust the headroom thereof. In addition, the digital controller may control the timing and/or slew rate of the headroom adjustment to achieve smooth mode transitions (e.g., between BYP and NPM).

Figure 2:
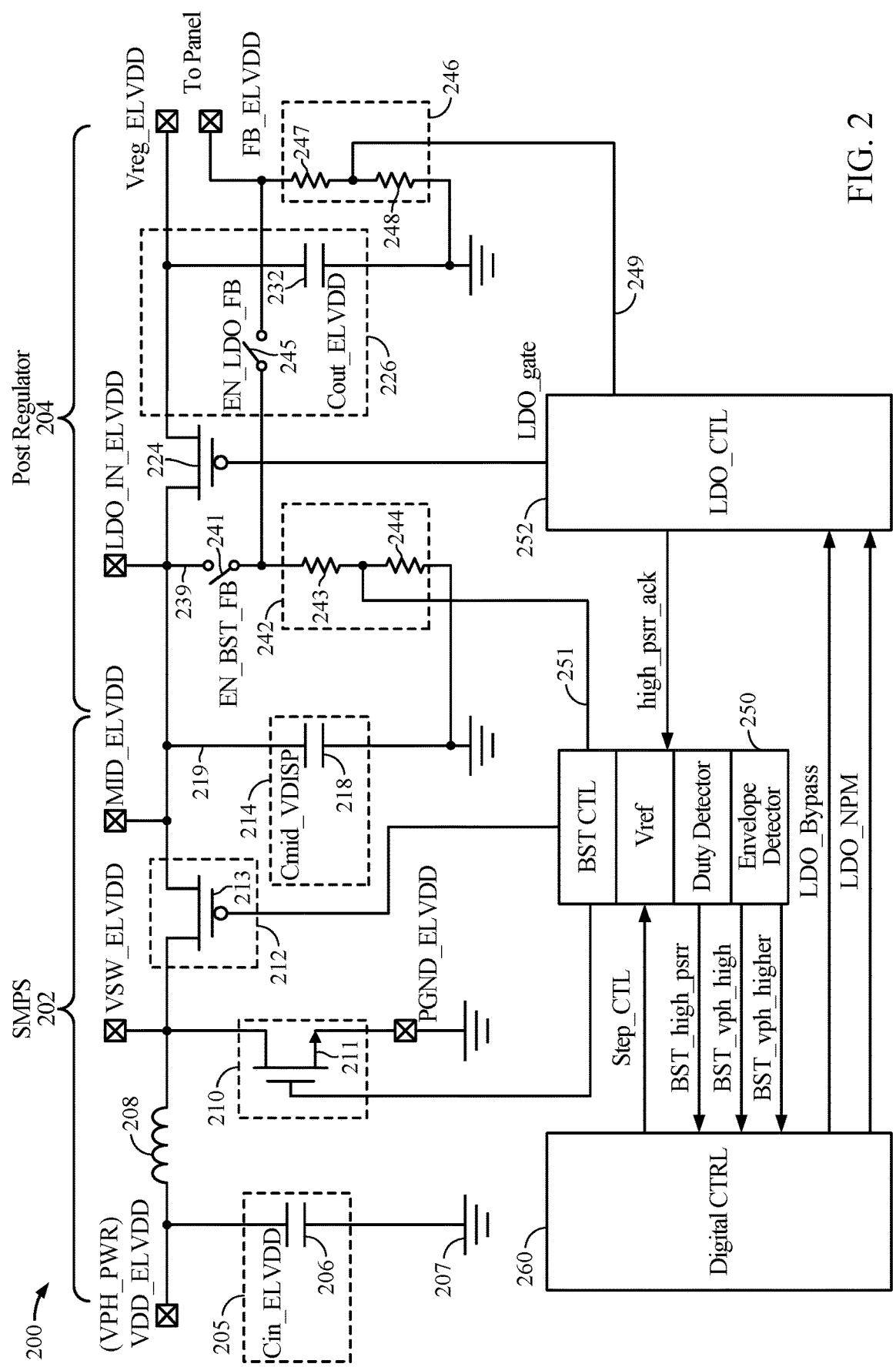
FIG. 2 is a block diagram of an example multi-mode power supply circuit architecture, in accordance with certain aspects of the present disclosure.

FIG. 2 is a block diagram of an example multi-mode power supply circuit 200, in accordance with certain aspects of the present disclosure. The multi-mode power supply circuit 200 includes a switched-mode power supply (SMPS) circuit 202 (e.g., a boost converter) followed by a post regulator circuit 204 (a voltage regulator circuit, such as a low dropout (LDO) regulator or other linear regulator).

The SMPS circuit 202 may be implemented as a boost converter as illustrated in FIG. 2. The boost converter may include, for example, an input filter 205, an inductor 208, a switch 210, a diode device 212, and an output filter 214. As depicted in FIG. 2, the input filter 205 may be implemented by an input shunt capacitor 206. The input shunt capacitor 206 may act as a bypass capacitor, shunting higher frequency signal components to the reference potential node (e.g., electrical ground 207) for the multi-mode power supply circuit 200. The inductor 208 may be coupled between a VDD_ELVDD node (also referred to as a "VPH_PWR" node) and a VSW_ELVDD node, the switch 210 may be coupled between the VSW_ELVDD node and the reference potential node (labeled "PGND_ELVDD"), and the diode device 212 may be coupled between the VSW_ELVDD node and a MID_ELVDD node (also referred to as a "VMID" node). The switch 210 may be implemented by a transistor 211, such as an n-channel metal-oxide-semiconductor field-effect transistor (n-MOSFET or NMOS) as illustrated, a bipolar junction transistor (BJT), or an insulated-gate bipolar transistor (IGBT). The diode device 212 may be implemented by a diode, a diode-connected transistor, or a transistor 213 with a body diode, such as a p-channel MOSFET (PMOS) as shown. The output filter 214 may be a low-pass filter designed to reduce ripple in the output voltage from the SMPS circuit 202. Such a low-pass filter may be implemented by, for example, one or more shunt capacitors, such as shunt capacitor 218 (labeled "Cmid_VDISP"). The output of the output filter 214 at node 219 may be considered as the output of the SMPS circuit 202 and/or the input of the post regulator circuit 204.

The gates of the transistors 211 and 213 may be coupled to and controlled by an SMPS control circuit 250. The SMPS control circuit 250 may control the duty cycle and switching frequency of the drive signals for the SMPS circuit 202. The SMPS control circuit 250 may also include logic and/or circuitry for adjusting a voltage reference (Vref), for detecting the duty cycle of a sensed signal, and/or for detecting an envelope of a sensed signal.

The post regulator circuit 204 may include a transistor 224 and an output filter 226. The transistor 224 may be a PMOS transistor as illustrated in FIG. 2. The PMOS transistor may have a drain coupled to an input node (labeled "LDO_IN_ELVDD") for the post regulator circuit 204 and a source coupled to the output filter 226. The output filter 226 may be a low-pass filter designed to reduce ripple in the output voltage (labeled "Vreg_ELVDD") from the post regulator circuit 204. Such a low-pass filter may be implemented by, for example, one or more shunt capacitors, such as shunt capacitor 232 (labeled "Cout_ELVDD").

The post regulator circuit 204 may be controlled by a post regulator control circuit 252, which may have an output coupled to the gate of the transistor 224. The post regulator control circuit 252 may include an error amplifier, for example.

The multi-mode power supply circuit 200 may also include one or more feedback elements for regulating the output voltage. These feedback elements may include a first feedback node 239 (labeled "LDO_IN_ELVDD"), a second feedback node 240 (labeled "FB_ELVDD"), a first voltage divider 242, a second voltage divider 246, a first feedback switch 241, and a second feedback switch 245. The LDO_IN_ELVDD node may be coupled (e.g., shorted) to the MID_ELVDD node as shown in FIG. 2 (such that the first feedback node 239 is the same as node 219).

A first terminal of the first voltage divider 242 may be selectively coupled to the first feedback node 239 via the first feedback switch 241 or selectively coupled to the second feedback node 240 via the second feedback switch 245. A second terminal of the first voltage divider 242 may be coupled to the reference potential node (e.g., electrical ground 207). The first voltage divider 242 may be implemented by two or more resistive elements 243, 244. A tap node 251 between the resistive elements 243, 244 may be coupled to the SMPS control circuit 250. The first voltage divider 242 is configured to generate a representative voltage that is a fraction of either the sensed output voltage of the SMPS circuit 202 or of the post regulator circuit 204.

The second voltage divider 246 may be coupled between the second feedback node 240 and the reference potential node (e.g., electrical ground 207). The second voltage divider 246 may be implemented by two or more resistive elements 247, 248. A tap node 249 between the resistive elements 247, 248 may be coupled to the post regulator control circuit 252 to generate a representative voltage that is a fraction of the sensed output voltage of the post regulator circuit 204.

The SMPS control circuit 250 and the post regulator control circuit 252 may be communicatively coupled to a digital control circuit 260. The digital control circuit 260 may output step control signals (labeled "Step_CTL") to control the SMPS control circuit 250. The digital control circuit 260 may also output a post regulator bypass mode control signal (labeled "LDO_Bypass") and a post regulator normal power mode control signal (labeled "LDO_NPM") to control the operational mode of the post regulator circuit 204. The digital control circuit 260 may receive various input signals, including a large input voltage noise/ripple detected signal (labeled "BST_high_psrr"), a high power supply input voltage level detected signal (labeled "BST_vph_high"), and a higher power supply input voltage level detected signal (labeled "BST_vph_higher") from the SMPS control circuit 250. Also as illustrated in FIG. 2, the SMPS control circuit 250 may receive a large input voltage noise/ripple acknowledgment signal (labeled "high_psrr_ack") from the post regulator control circuit 252.

The post regulator circuit 204 may operate in bypass mode (BYP), normal power mode (NPM), or active-bypass mode (a transitional mode between BYP and NPM). If the input voltage (e.g., VPH_PWR, also shown as VDD_ELVDD in FIG. 2) is clean and in normal operation range (e.g., 2.5 to 4.5 V), then the post regulator circuit 204 stays in bypass mode with a relatively low conduction resistance (e.g., on-resistance ($R_{DS\_on}$) of p-channel metal-oxide semiconductor (PMOS) transistor less than 100 mΩ). To enter bypass mode, the post regulator control circuit 252 may output a signal to the gate of transistor 224 to drive the transistor 224 into linear mode (e.g., pull the gate of transistor 224 down to ground potential).

If VPH_PWR suffers a large noise/ripple (referred to herein as a "High_PSRR regulation event," or a "High_PSRR event" for short) or is higher than the output voltage (Vreg_ELVDD) of the multi-mode power supply circuit 200 (defined as a High_VPH event), the post regulator circuit 204 may be automatically enabled into active-bypass mode followed shortly thereafter by normal power mode (NPM). The main control logic (e.g., in the digital control circuit 260) may have a digital finite state machine (FSM) and may be used to control the post regulator mode transitions, especially the placement of the post regulator circuit 204 in normal power mode. The post regulator circuit 204 may be kept in bypass mode for the majority of the time for higher efficiency compared to normal power mode. The post regulator circuit 204 may be moved to normal power mode to better handle the two system events described above (High_PSRR and High_VPH). These two events are asynchronous in nature and can happen at any point in time. The events can happen separately or concurrently, and the event duration may not be predictable.

In detail, the digital FSM will perform step control, delay control, clamp voltage and switching frequency adjustment, and blanking and cooldown timing control. Step control may involve adjusting the headroom of the post regulator circuit 204 (e.g., of an LDO) from 0 millivolts (mV) to any value based on different input power supply voltage (e.g., VPH_PWR) conditions. The slew rate of the headroom may be sufficiently controlled by a digital stepper in the digital control circuit 260. Delay control may entail adjusting the timing and delay of entry to and/or exit from normal power mode based on the input power supply voltage (e.g., VPH_PWR) condition to have smooth transition(s). The delay(s) may be determined by the warm-up time of the analog circuitry (e.g., in the post regulator circuit 204). As described below with respect to FIG. 4, the clamp voltage and switching frequency adjustment may include optimizing, or at least adjusting, the behavior of the SMPS circuit 202 (e.g., a boost converter) to have a smooth transition for the SMPS. For blanking and cooldown timing control, the sequencer in the digital control circuit 260 may automatically decide to stay in normal power mode or exit to bypass mode, as described below with respect to FIG. 5.

Figure 3A:
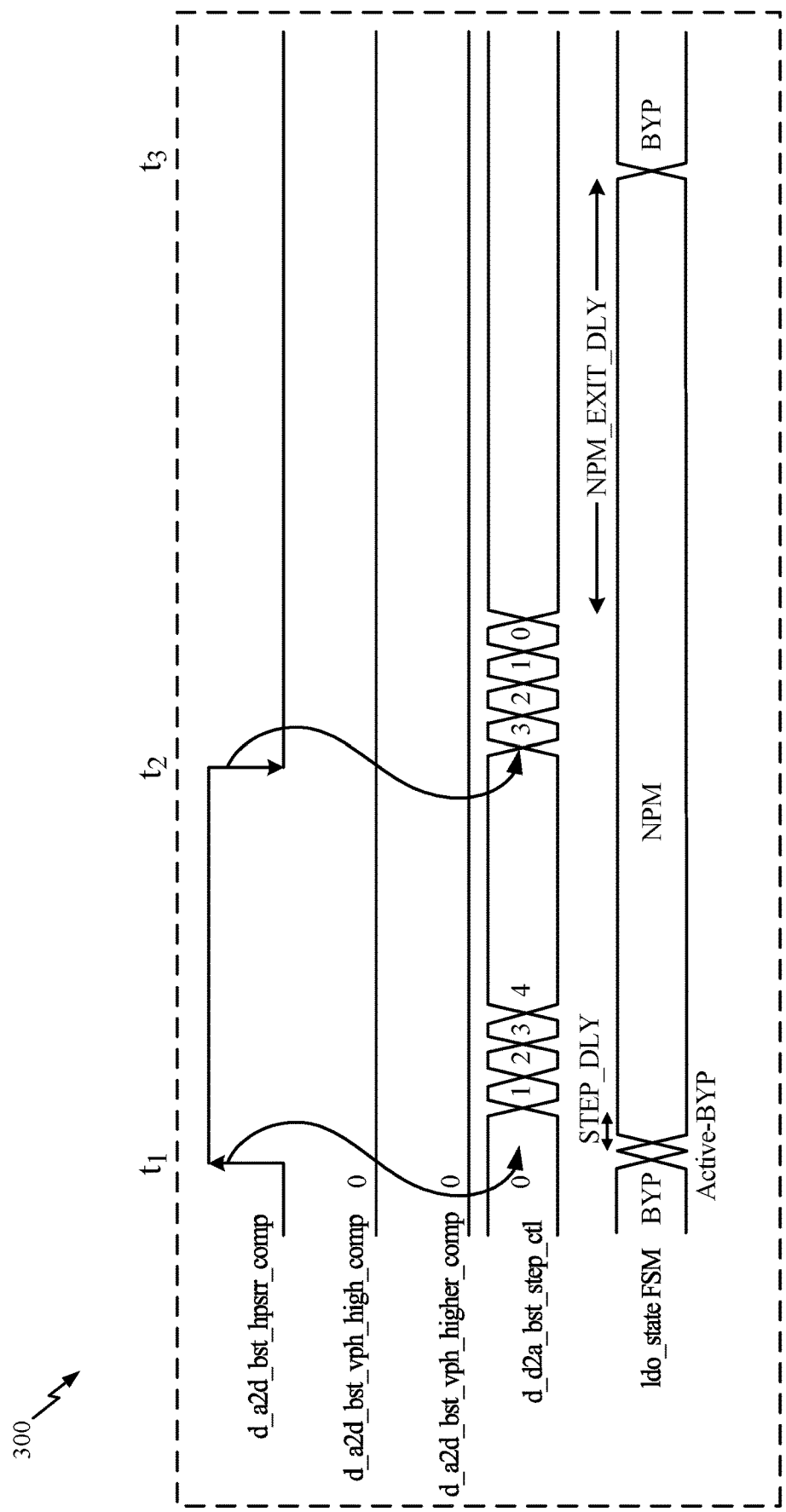
FIG. 3A is an example timing diagram of digital signals associated with an example multi-mode power supply circuit during a large noise/ripple event for the power supply input voltage, in accordance with certain aspects of the present disclosure.
Figure 3B:
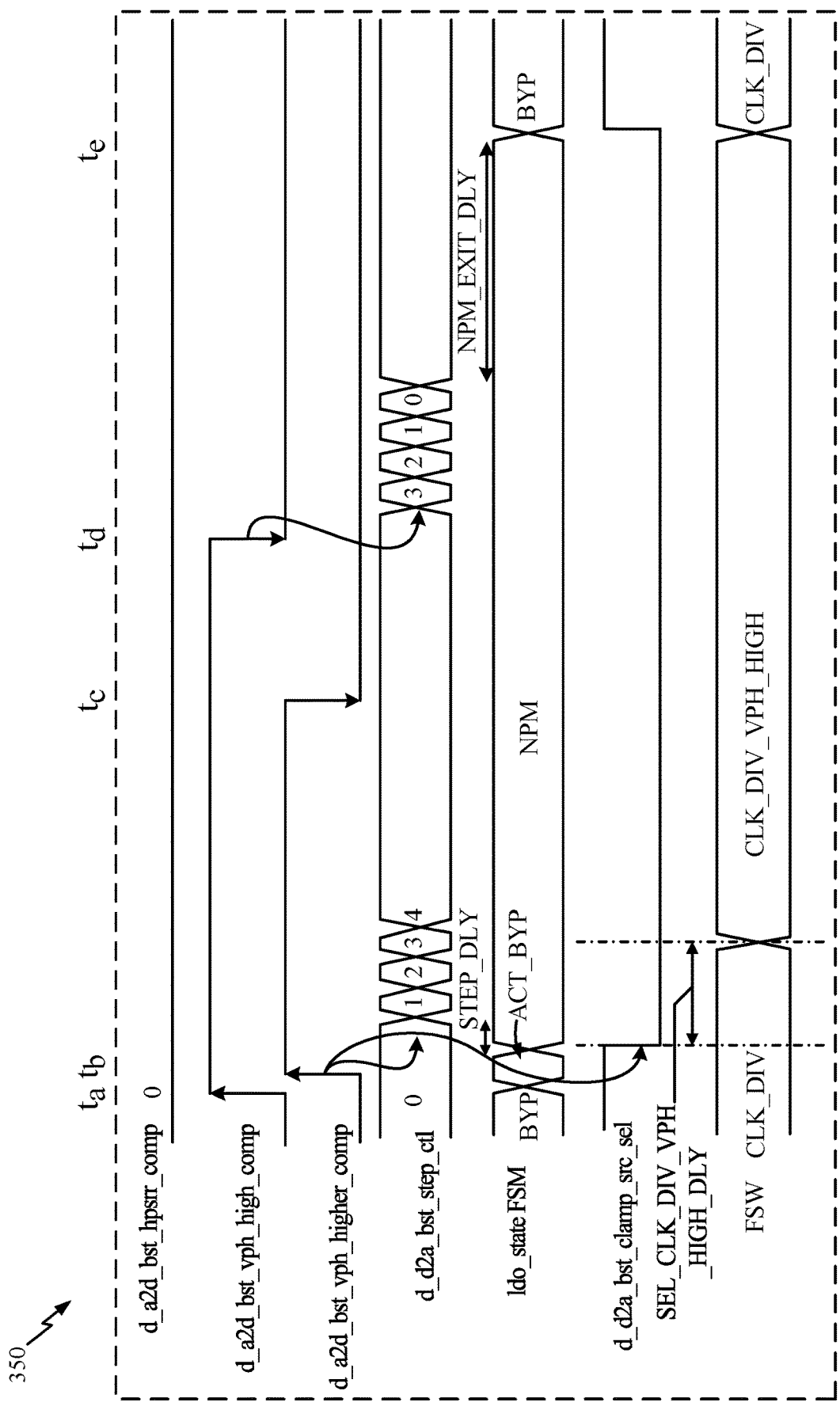
FIG. 3B is an example timing diagram of digital signals associated with an example multi-mode power supply circuit during a high voltage level event for the power supply input voltage, in accordance with certain aspects of the present disclosure.

FIG. 3A is an example timing diagram 300 of digital signals associated with an example multi-mode power supply circuit (e.g., circuit 200) during a large noise/ripple event for the power supply input voltage (e.g., a High_PSRR event), in accordance with certain aspects of the present disclosure. FIG. 3B is an example timing diagram 350 of digital signals associated with an example multi-mode power supply circuit (e.g., circuit 200) during a high voltage level event for the power supply input voltage (e.g., a High_VPH event), in accordance with certain aspects of the present disclosure. High_PSRR and High_VPH events are unrelated. For example, High_PSRR and High_VPH may have different headroom voltage and different entry/exit delay timing setting. The digital control circuit 260 may automatically optimize, or at least adjust, the setting when two events are mixed together (i.e., both events occur concurrently).

In the timing diagram 300 of FIG. 3A, the post regulator circuit (e.g., the LDO) is initial operating in bypass mode (BPM) as indicated by the state of the FSM (signal labeled "ldo_state_FSM"). The timing diagram 300 also shows digital signals for indicating regulation triggered for a large input voltage noise/ripple event (the digital analog-to-digital boost converter high PSRR compensation signal labeled "d_a2d_bst_hpsrr_comp"), for indicating regulation triggered (e.g., at 4.4 V) for a high input voltage level event (the digital analog-to-digital boost converter high input voltage level compensation signal labeled "d_a2d_bst_vph_high_comp"), and for indicating regulation triggered (e.g., at 4.5 V) for a higher input voltage level event (the digital analog-to-digital boost converter higher input voltage level compensation signal labeled "d_a2d_bst_higher_comp"). In the scenario of FIG. 3A, a high input voltage level is not detected, so digital signals d_a2d_bst_high_comp and d_a2d_bst_higher_comp remain logic low throughout the period illustrated in the timing diagram 300.

At time $t_1$, a large input voltage noise/ripple event is detected by the multi-mode power supply circuit, and thus, digital signal d_a2d_bst_hpsrr_comp changes from logic low to logic high to enable PSRR regulation. This causes the FSM to temporarily enter the active-bypass mode and subsequently enter the normal power mode (NPM) to turn on the post regulator circuit, as indicated by the ldo_state_FSM signal. Triggering PSRR regulation also activates digital step control, as indicated by the digital digital-to-analog boost converter step control signal labeled "d_d2a_bst_step_ctl" in FIG. 3A. As described above, step control may involve adjusting the headroom of the post regulator circuit (e.g., an LDO). The headroom adjustment using step control may be based on the type, amplitude, and/or duration of the detected input voltage noise/ripple. The digital controller may also use step control to control the slew rate of the headroom adjustment.

There may a delay (referred to as a "step delay") between entering the active-bypass mode (as indicated by ldo_state_FSM) and the first step adjustment indicated by d_d2a_bst_step_ctl. The digital controller may control this delay based on the input power supply voltage (e.g., VPH_PWR) condition to ensure smooth transition(s) between modes. The delay may be based on the warm-up time of the analog circuitry.

Eventually, the large input voltage noise/ripple event may end and no longer be detected by the multi-mode power supply circuit, and therefore at time $t_2$, d_a2d_bst_hpsrr_comp changes from logic high to logic low to disable PSRR regulation. This may lead to backing out the headroom adjustments made by step control, as indicated by d_d2a_bst_step_ctl. For certain aspects, the FSM may then enter bypass mode by disabling the post regulator circuit. To avoid returning to bypass mode prematurely for other aspects, the FSM may delay exiting normal power mode for a period referred to herein as a "blanking time" (labeled in FIG. 3A as "NPM_EXIT_DLY"). In this case, the FSM may enter bypass mode at time $t_3$ unless another input voltage event is detected during the blanking time.

In the timing diagram 350 of FIG. 3B, the post regulator circuit (e.g., the LDO) is initial operating in bypass mode (BPM) as indicated by ldo_state_FSM with a particular switching frequency (e.g., the switching frequency state labeled "CLK_DIV") of the SMPS circuit, as indicated by the digital switching frequency signal (labeled "FSW"). In the scenario of FIG. 3B, a large input voltage noise/ripple event is not detected, so d_a2d_bst_hpsrr_comp remains logic low throughout the period illustrated in the timing diagram 350.

At time $t_a$, a high input voltage level event is detected by the multi-mode power supply circuit, and thus, the d_a2d_bst_high_comp signal changes from logic low to logic high to enable high input voltage regulation. This rising edge may cause the FSM to temporarily enter the active-bypass mode and subsequently enter the normal power mode (NPM) to activate the post regulator circuit, as indicated by the ldo_state_FSM signal. At time $t_b$, a higher input voltage level event is detected by the multi-mode power supply circuit, and thus, the d_a2d_bst_higher_comp signal changes from logic low to logic high. The rising edge of the d_a2d_bst_higher_comp signal triggers digital step control, as indicated by the d_d2a_bst_step_ctl signal in FIG. 3B, to adjust the headroom of the post regulator circuit (e.g., an LDO). The digital controller may also use step control to control the slew rate of the headroom adjustment.

There may a delay (referred to as a "step delay") between entering the active-bypass mode (as indicated by ldo_state_FSM) and the first step adjustment indicated by d_d2a_bst_step_ctl. The digital controller may control this delay based on the input power supply voltage (e.g., VPH_PWR) condition to ensure smooth transition(s) between modes. The delay may be based on the warm-up time of the analog circuitry.

In the timing diagram 350, the rising edge of the d_a2d_bst_higher_comp signal may also trigger enablement or adjustment of a clamping circuit as indicated by the falling edge of the digital digital-to-analog boost converter clamp source select signal (labeled "d_d2a_bst_clamp_src_sel"). After adjusting the clamping circuit, the switching frequency of the SMPS circuit may be adjusted (e.g., decreased) as indicated by the FSW signal to a different switching frequency (e.g., to the switching frequency state labeled "CLK_DIV_VPH_HIGH"). There may be a delay (labeled "SEL_CLK_DIV_VPH_HIGH_DLY") between triggering the clamping circuit (as indicated by d_d2a_bst_clamp_src_sel) and the switching frequency adjustment indicated by the FSW signal. This delay may be controlled by the digital controller, as well.

Eventually, the high input voltage level may begin to decrease (e.g., after unplugging a wall adapter). When the higher input voltage level is no longer detected by the multi-mode power supply circuit, the d_a2d_bst_vph_higher_comp signal changes from logic high to logic low at time $t_c$. As the high input voltage level continues to decrease, the multi-mode power supply circuit may no longer detect the high input voltage level, and at time $t_d$, the d_a2d_bst_vph_high_comp signal changes from logic high to logic low to disable high input voltage regulation. This may lead to backing out the headroom adjustments made by step control, as indicated by d_d2a_bst_step_ctl. For certain aspects, the FSM may then enter bypass mode by disabling the post regulator circuit. To avoid returning to bypass mode prematurely for other aspects, the FSM may delay exiting normal power mode for a blanking time (labeled in FIG. 3B as "NPM_EXIT_DLY") as described above. The blanking time associated with high input voltage regulation may be the same or different from the blanking time associated with high PSRR regulation. The FSM may enter bypass mode at time $t_e$ as indicated by the ldo_state_FSM signal in FIG. 3B, unless another input voltage event is detected during the blanking time. Also at time $t_e$, the clamping circuit may be disabled or return to its previous state as indicated by the rising edge of the d_d2a_bst_clamp_src_sel signal, and the switching frequency may return to the CLK_DIV state, as indicated by the FSW signal in FIG. 3B.

Figure 4:
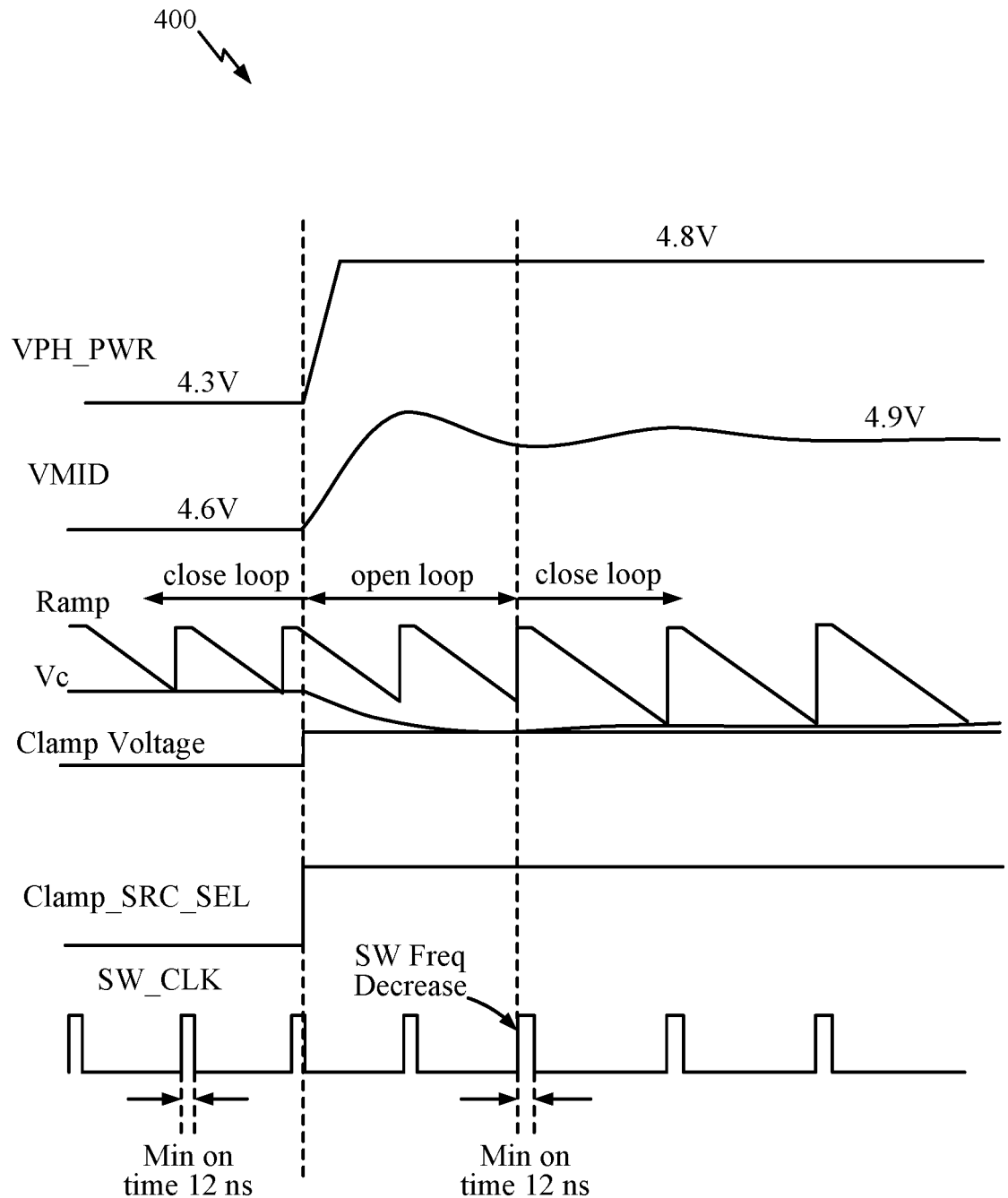
FIG. 4 is a timing diagram of various signals associated with an example multi-mode power supply circuit during overshoot of a power supply input voltage, in accordance with certain aspects of the present disclosure.

FIG. 4 is a timing diagram 400 of various signals associated with an example multi-mode power supply circuit (e.g., circuit 200) during overshoot of a power supply input voltage (e.g., VPH_PWR), in accordance with certain aspects of the present disclosure. For example, this overshoot may be caused by plugging in a wall adapter. The timing diagram 400 illustrates adoptive switching (SW) frequency adjustment and clamping enablement. If VPH_PWR overshoots to a particular voltage level (e.g., 4.8 V) or above, the SMPS (e.g., the boost converter) may not be able to maintain regulation due, for example, to a minimum on-time (e.g., 12 ns as shown in FIG. 4) for the shunt transistor (e.g., transistor 211) in the SMPS topology. In this case, the VMID voltage (labeled "MID_ELVDD" in FIG. 2) will also overshoot as shown. With the assistance of the digital controller (e.g., digital control circuit 260), when this condition is detected, the switching frequency may be immediately decreased (as illustrated by the switching frequency clock signal labeled "SW_CLK") to have equivalently less duty cycle (as indicated by the Ramp signal in FIG. 4) and maintain the regulation. Meanwhile, the digital controller may enable an internal clamp circuit (as indicated by the clamp source select signal labeled "Clamp_SRC_SEL," the clamp voltage signal, and the Vc signal) to allow the analog circuitry to have faster recovery. Similar, but opposite behavior may be used on the exit edge when VPH_PWR returns to normal voltage levels (e.g., the switching frequency is increased).

Figure 5:
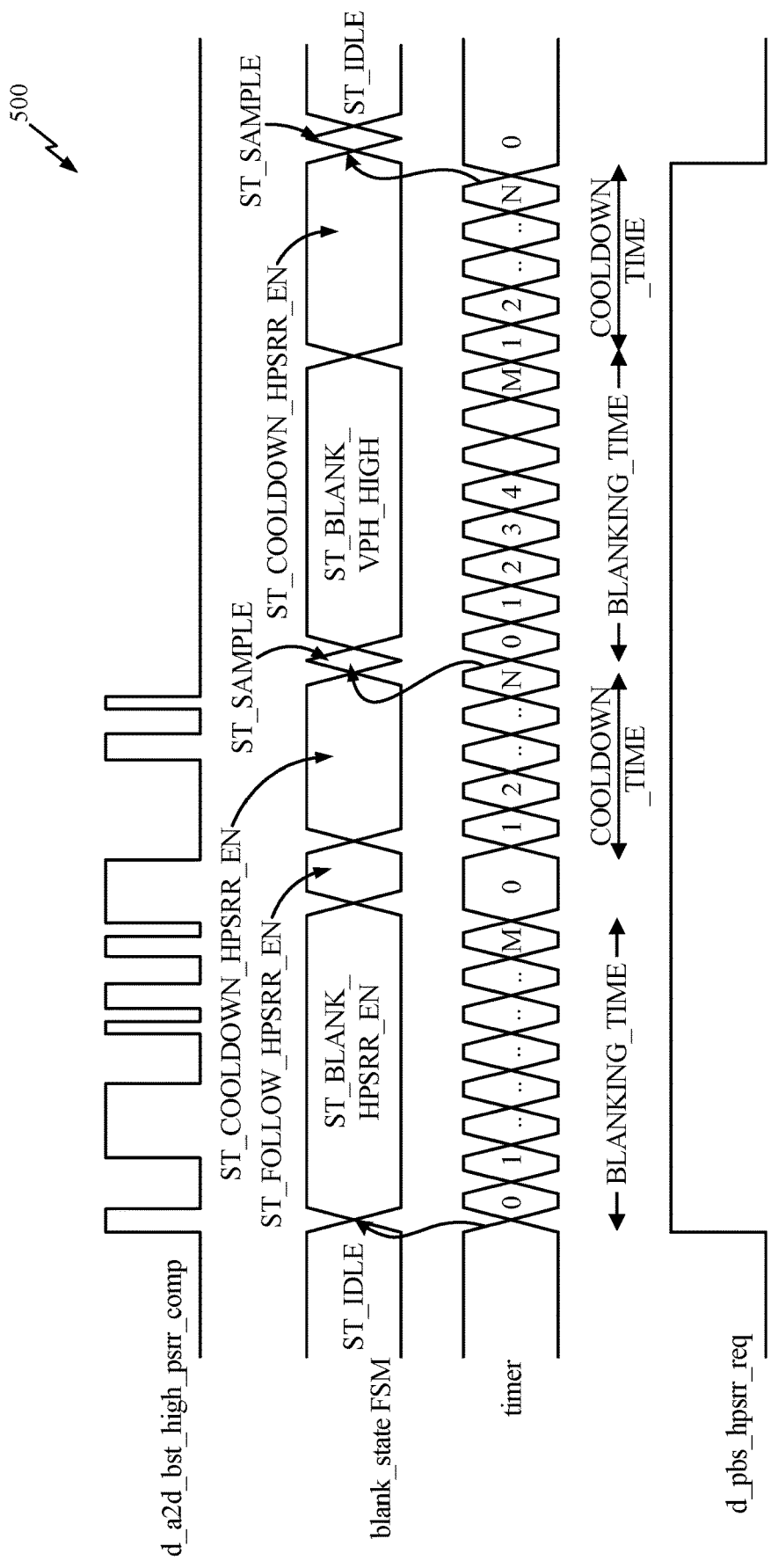
FIG. 5 is a timing diagram of digital signals associated with an example multi-mode power supply circuit during a large input voltage noise/ripple event, illustrating blanking and cooldown timer behavior, in accordance with certain aspects of the present disclosure.

FIG. 5 is a timing diagram 500 of digital signals associated with an example multi-mode power supply circuit (e.g., circuit 200) during a large input voltage noise/ripple event (also referred to herein as a High_PSRR event), illustrating blanking and cooldown timer behavior, in accordance with certain aspects of the present disclosure. A High_PSRR event is detected when the d_a2d_bst_high_psrr_comp signal gets asserted. The digital controller (e.g., digital control circuit 260) may change the post regulator circuit (e.g., the LDO) from the bypass mode (BYP) to the normal power mode (NPM), may assert a digital controller signal (labeled "d_pbs_hpsrr_req") indicating the post regulator circuit is in NPM, and may start a blanking timer. As long as the blanking timer is running, the post regulator circuit is retained in NPM. When the blanking time is completed, a cooldown timer is started while the post regulator circuit is still retained in NPM. During the cooldown time, if any new event request is received (as illustrated during the first cooldown period in FIG. 5), this request is latched, and at the end of the cooldown time, a new cycle of blanking and subsequent cooldown time is restarted. When no new requests are received in a cooldown cycle (as illustrated during the second cooldown period in FIG. 5), the d_pbs_hpsrr_req signal is deasserted, and the post regulator circuit is moved from NPM to BYP, as illustrated.

Figure 6:
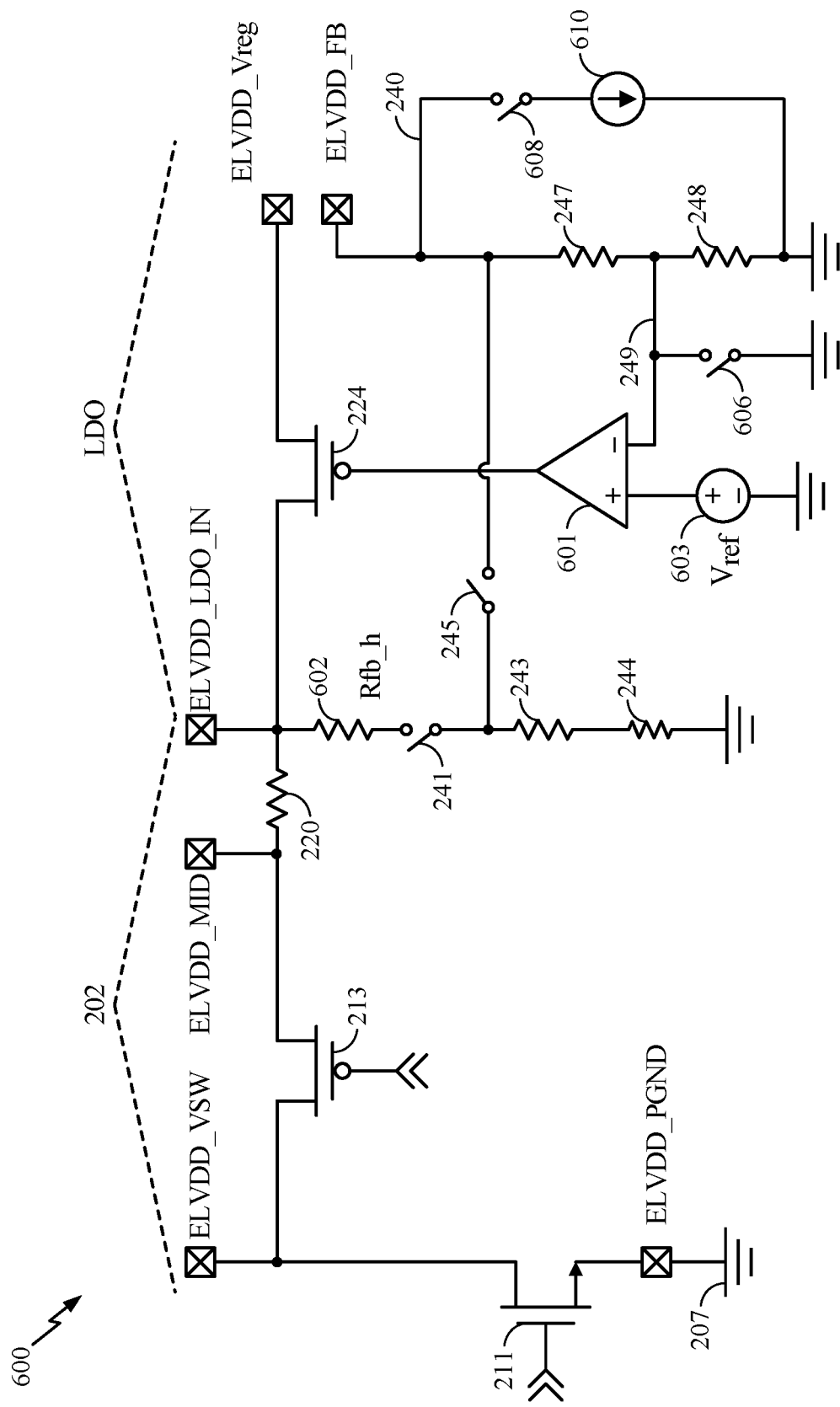
FIG. 6 is a circuit diagram of example programmable regulation point offset circuitry for the multi-mode power supply circuit architecture of FIG. 2, in accordance with certain aspects of the present disclosure.

FIG. 6 is a circuit diagram 600 of programmable regulation point offset circuitry for the multi-mode power supply circuit 200 of FIG. 2, in accordance with certain aspects of the present disclosure. As shown in the multi-mode power supply circuit 200, only one feedback point may be used for the SMPS loop and the post regulator loop in BYP and NPM, respectively. When the post regulator circuit has a mode transition (e.g., from BYP to NPM), the initial condition of the post regulator error amplifier 601 (e.g., in the post regulator control circuit 252) is uncertain due to mismatch of the two loops. As a result, the transient behavior of the post regulator may either overshoot or undershoot. Using the circuit diagram 600, the digital controller (e.g., digital control circuit 260) may force the post regulator regulation point slightly higher than the input, forcing the starting point to present an overshoot. This may be implemented by adjusting a programmable reference voltage 603 for the error amplifier 601 in the post regulator and/or closing a switch 606 across one resistive element 248 in the second voltage divider 246 for post regulator feedback. Then, the digital controller may change the regulation point back to the desired point after a short delay time (e.g., by opening the previously closed switch 606). To minimize the overshoot, a current sink 610 may also be turned on or otherwise enabled during this initial period to absorb the extra power. This temporary activation of the current sink 610 may be implemented by closing a switch 608 in series with the current sink, where the series combination of the current sink 610 and the switch 608 is coupled in parallel with the second voltage divider 246 for post regulator feedback, as illustrated in FIG. 6.

The circuit diagram 600 also includes a resistive element 602 (labeled "Rfb_h") in series with the switch 241 and the first voltage divider 242. The resistive element 602 may have a resistance equivalent (e.g., within 5% tolerance) to the on-resistance of the transistor 224 in the post regulator circuit and may be used to compensate, or at least adjust, for the current*resistance (IR) drop across the transistor 224 when sensing the output voltage of the SMPS circuit using the first voltage divider 242 during bypass mode.

Although Vreg_ELVDD and FB_ELVDD are illustrated in FIGS. 2 and 6 as being unconnected, these two nodes may be shorted or otherwise coupled together in the load circuit (not shown) for the multi-mode power supply circuit. For example, the load circuit may be located on the printed circuit board (PCB) on which the multi-mode power supply circuit is disposed.

Figure 7A:
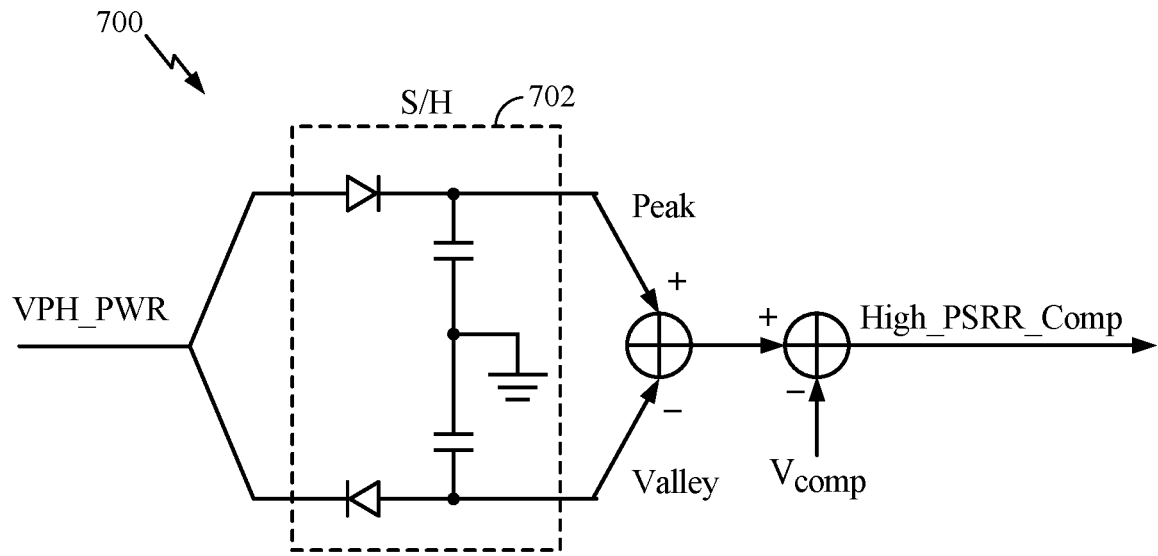
FIG. 7A is a block diagram of circuitry for large input voltage noise/ripple event detection, in accordance with certain aspects of the present disclosure.

FIG. 7A is a block diagram of example circuitry 700 for large input voltage noise/ripple event detection (e.g., high PSRR regulation event detection), in accordance with certain aspects of the present disclosure. As illustrated, the ripple of VPH_PWR is sensed by two differential sample-and-hold (S/H) circuits 702. The peak and valley signals are the maximum and minimum voltage values, respectively, of VPH_PWR in a certain period. The sampled difference between the peak and valley signals represents the maximum ripple of VPH_PWR. If this ripple is higher than a threshold voltage (labeled "$V_{comp}$"), a digital signal (e.g., High_PSRR_Comp) is triggered.

Figure 7B:
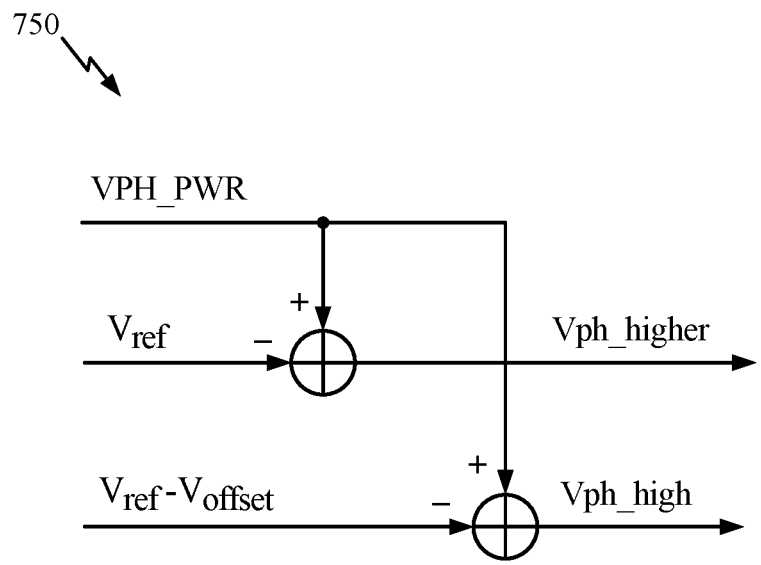
FIG. 7B is a block diagram of circuitry for high input voltage level event detection, in accordance with certain aspects of the present disclosure.

FIG. 7B is a block diagram of example circuitry 750 for high input voltage level event detection (e.g., high VPH_PWR event detection), in accordance with certain aspects of the present disclosure. For example, a load release of a charger may cause VPH_PWR to overshoot to 5.25 V in 10 to 100 µs. Moreover, during battery charging, the DC value of VPH_PWR may slowly increase up to 4.8 V. Two signals are employed to detect a high VPH_PWR event: (1) Vph_high is used to warm up the analog circuitry or tell the digital controller to keep the post regulator (e.g., LDO) in NPM if the post regulator has been in NPM; and (2) Vph_higher is used to determine whether a real high VPH_PWR event is occurring. Vph_higher may be triggered if VPH_PWR is a greater than a first threshold voltage (labeled "Vref"), whereas Vph_high may be triggered if VPH_PWR is greater than a second threshold voltage lower than the first threshold voltage by a particular amount (labeled "Voffset").

The multi-mode power supply circuit described herein accommodates the stringent performance constraints of high PSRR regulation and VPH_PWR overshoot. In normal condition, the efficiency may be as high as a switched-mode power supply circuit (e.g., a boost converter, whose peak efficiency can be up to about 96 to 97%). In LDO normal power mode, the PSRR of the multi-mode power supply circuit can be enhanced, for example, from 20 dB to 50 dB at 10 kHz frequency. When VPH_PWR overshoots above 4.6 V, the boost converter can still maintain regulation, and the total efficiency may remain above 85%. This number is significantly higher (by about 10%) than off-the-shelf products, which typically employ asynchronous mode operation.

Certain aspects of the present disclosure provide a power supply circuit (e.g., multi-mode power supply circuit 200). The power supply circuit generally includes a switched-mode power supply (SMPS) circuit (e.g., SMPS circuit 202), a voltage regulator circuit (e.g., post regulator circuit 204) having an input coupled to an output of the SMPS circuit, the voltage regulator circuit being selectively enabled, a first voltage divider (e.g., first voltage divider 242) selectively coupled to the output of the SMPS circuit and selectively coupled to an output of the voltage regulator circuit, and a second voltage divider (e.g., second voltage divider 246) coupled to the output of the voltage regulator circuit.

According to certain aspects, the power supply circuit further includes a switch (e.g., switch 606) coupled in parallel with at least one resistive element (e.g., resistive element 248) of the second voltage divider. For certain aspects, the power supply circuit further includes a current source (e.g., current sink 610) selectively coupled in parallel with the second voltage divider.

According to certain aspects, the SMPS circuit comprises a boost converter circuit.

According to certain aspects, the voltage regulator circuit comprises a low-dropout (LDO) regulator circuit. For certain aspects, the LDO regulator circuit includes a transistor (e.g., transistor 224) having a drain coupled to the input of the voltage regulator circuit and a source coupled to the output of the voltage regulator circuit; a voltage reference (e.g., reference voltage 603); and an error amplifier (e.g., error amplifier 601) having an output coupled to a gate of the transistor, a first input coupled to the voltage reference, and a second input coupled to a tap (e.g., tap node 249) of the second voltage divider. For certain aspects, the power supply circuit further includes logic (e.g., post regulator control circuit 252) configured to disable the LDO regulator circuit by operating the transistor in a saturation mode. For certain aspects, the power supply circuit further includes a first switch (e.g., switch 241) coupled between the output of the SMPS circuit and the first voltage divider and a second switch (e.g., switch 245) coupled between the output of the voltage regulator circuit and the first voltage divider. In this case, the power supply circuit may further include logic (e.g., the digital control circuit 260 and/or the post regulator control circuit 252) configured to: (1) close the first switch and open the second switch, if the voltage regulator circuit is disabled; and (2) open the first switch and close the second switch, if the voltage regulator circuit is enabled. For certain aspects, the power supply circuit further includes a resistive element coupled between the output of the SMPS circuit and the first switch. In this case, a resistance of the resistive element may correspond (e.g., match within 5% or within 10%) to an on-resistance (e.g., $R_{DS\_on}$) of the transistor.

Certain aspects of the present disclosure provide a power management integrated circuit (PMIC) (e.g., PMIC 124) comprising at least a portion of the power supply circuit described above.

Certain aspects of the present disclosure provide a battery charging circuit comprising the power supply circuit described above.

Figure 8:
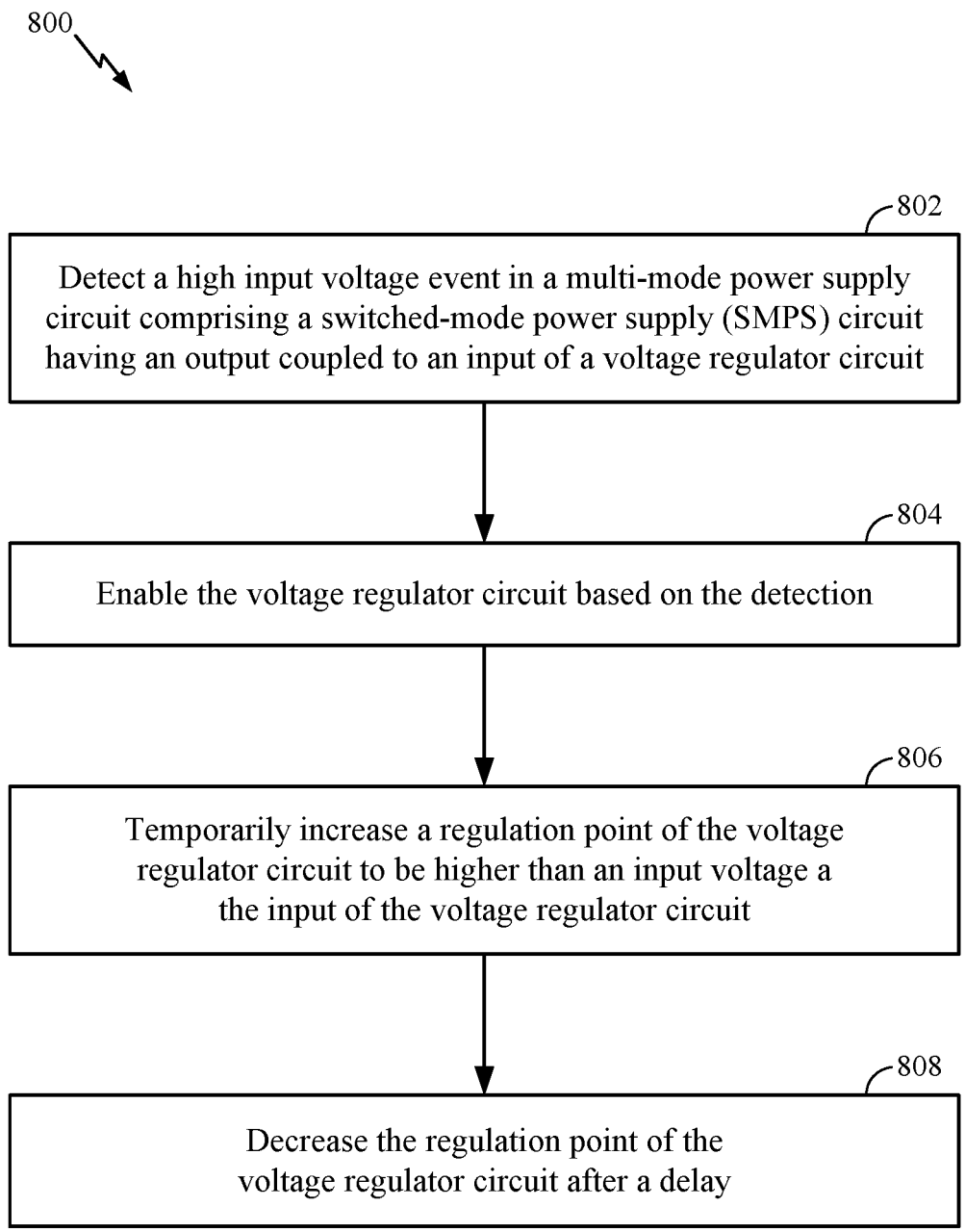
FIG. 8 is a flow diagram of example operations for power supply regulation in a multi-mode power supply circuit, in accordance with certain aspects of the present disclosure.

FIG. 8 is a flow diagram of example operations 800 for power supply regulation in a multi-mode power supply circuit, in accordance with certain aspects of the present disclosure. The operations 800 may be performed, for example, by the multi-mode power supply circuit 200 of FIG. 2 or FIG. 6. The multi-mode power supply circuit may include a switched-mode power supply (SMPS) circuit (e.g., SMPS circuit 202) having an output coupled to an input of a voltage regulator circuit (e.g., post regulator circuit 204).

The operations 800 may begin, at block 802, with the multi-mode power supply circuit detecting a high input voltage event. At block 804, the multi-mode power supply circuit may enable the voltage regulator circuit based on the detection at block 802. At block 806, the multi-mode power supply circuit may temporarily increase a regulation point of the voltage regulator circuit to be higher than an input voltage at the input of the voltage regulator circuit. At block 808, the multi-mode power supply circuit may decrease the regulation point of the voltage regulator circuit after a delay.

According to certain aspects, increasing the regulation point of the voltage regulator circuit at block 806 may involve closing a first switch (e.g., switch 606) coupled in parallel with at least one resistive element (e.g., resistive element 248) of a voltage divider (e.g., second voltage divider 246) coupled to an output (e.g., Vreg_ELVDD) of the voltage regulator circuit. In this case, decreasing the regulation point may entail opening the first switch coupled in parallel with the voltage divider. For certain aspects, increasing the regulation point of the voltage regulator circuit at block 806 further includes: (1) enabling a current sink (e.g., current sink 610) coupled to the output of the voltage regulator circuit; or (2) closing a second switch (e.g., switch 608) in series with the current sink to couple the current sink to the output of the voltage regulator circuit.

According to certain aspects, increasing the regulation point of the voltage regulator circuit involves adjusting a reference voltage (e.g., reference voltage 603) for the voltage regulator circuit.

According to certain aspects, the high input voltage event comprises a large input voltage noise/ripple event for the multi-mode power supply circuit.

According to certain aspects, the high input voltage event comprises a high input voltage level event for the multi-mode power supply circuit.

According to certain aspects, the operations 800 further involve the multi-mode power supply circuit detecting the high input voltage event has ended and disabling the voltage regulator circuit based on the detecting the high input voltage event has ended.

Certain aspects of the present disclosure provide an apparatus for supplying power via multiple modes. The apparatus generally includes means for supplying power via switching regulation (e.g., an SMPS, such as SMPS circuit 202); means for regulating a voltage (e.g., a voltage regulator, such as an LDO or post regulator circuit 204) from the means for supplying power; means for detecting (e.g., voltage divider 242 and/or voltage divider 246) a high input voltage event in the apparatus; means for enabling (e.g., a control circuit, such as the post regulator control circuit 252 and/or the error amplifier 601) the means for regulating the voltage, based on the detection; means for temporarily increasing (e.g., a programmable voltage source, such as programmable reference voltage 603, a current sink, such as current sink 610, and/or a switch, such as switch 606) a regulation point of the means for regulating the voltage to be higher than the voltage from the means for supplying power; and means for decreasing (e.g., a programmable voltage source, such as programmable reference voltage 603, a current sink, such as current sink 610, and/or one or more switches, such as switch 606 and/or switch 608) the regulation point of the means for regulating the voltage, after a delay.

According to certain aspects, the apparatus further comprises means for dividing (e.g., voltage divider 246) a voltage output from the means for regulating the voltage from the means for supplying power. For certain aspects, the means for temporarily increasing the regulation point may include means for selectively shorting (e.g., switch 606) at least one element (e.g., resistive element 248) of the means for dividing. In this case, the means for decreasing the regulation point may include the means for selectively shorting the at least one element of the means for dividing. For certain aspects, the means for temporarily increasing the regulation point of the means for regulating the voltage further includes means for sinking a current (e.g., current sink 610 and/or switch 608) from an output (e.g., ELVDD_Vreg) of the means for regulating the voltage.

According to certain aspects, the means for temporarily increasing the regulation point includes means for adjusting a reference voltage (e.g., programmable reference voltage 603) for the means for regulating the voltage from the means for supplying power.

According to certain aspects, the high input voltage event comprises a large input voltage noise/ripple event.

According to certain aspects, the high input voltage event comprises a high input voltage level event.

According to certain aspects, the apparatus further includes means for detecting (e.g., voltage divider 242 and/or voltage divider 246) the high input voltage event has ended and means for disabling (e.g., a control circuit, such as the post regulator control circuit 252 and/or the error amplifier 601) the means for regulating the voltage, based on the detection that the high input voltage event has ended.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A power supply circuit comprising:
   a switched-mode power supply (SMPS) circuit;
   a voltage regulator circuit comprising a transistor, the voltage switching regulator having an input coupled to an output of the SMPS circuit, the voltage regulator circuit being selectively enabled;
   a first voltage divider selectively coupled to at least one of the output of the SMPS circuit or the input of the voltage regulator circuit and selectively coupled to an output of the voltage regulator circuit;
   a second voltage divider coupled to the output of the voltage regulator circuit;
   a first switch coupled between the output of the SMPS circuit and the first voltage divider; and
   a second switch coupled between the output of the voltage regulator circuit and the first voltage divider.

2. The power supply circuit of claim 1, further comprising a switch coupled in parallel with at least one resistive element of the second voltage divider.

3. The power supply circuit of claim 1, wherein the SMPS circuit comprises a boost converter circuit.

4. The power supply circuit of claim 1, wherein the voltage regulator circuit comprises a low-dropout (LDO) regulator circuit.

5. A power management integrated circuit (PMIC) comprising at least a portion of the power supply circuit of claim 1.

6. The power supply circuit of claim 2, further comprising a current source selectively coupled in parallel with the second voltage divider.

7. The power supply circuit of claim 4, wherein the LDO regulator circuit comprises:
   the transistor having a drain coupled to the input of the voltage regulator circuit and a source coupled to the output of the voltage regulator circuit;
   a voltage reference; and
   an error amplifier having an output coupled to a gate of the transistor, a first input coupled to the voltage reference, and a second input coupled to a tap of the second voltage divider.

8. The power supply circuit of claim 7, further comprising logic configured to disable the LDO regulator circuit by operating the transistor in a saturation mode.

9. The power supply circuit of claim 1, further comprising logic configured to:
   close the first switch and open the second switch, if the voltage regulator circuit is disabled; and
   open the first switch and close the second switch, if the voltage regulator circuit is enabled.

10. The power supply circuit of claim 1, further comprising a resistive element coupled between the output of the SMPS circuit and the first switch.

11. The power supply circuit of claim 10, wherein a resistance of the resistive element corresponds to an on-resistance of the transistor.

12. A method of operating a multi-mode power supply circuit, comprising:
   detecting a high input voltage event in the multi-mode power supply circuit comprising a switched-mode power supply (SMPS) circuit having an output coupled to an input of a voltage regulator circuit;
   enabling the voltage regulator circuit based on the detection;
   temporarily increasing a regulation point of the voltage regulator circuit to he higher than an input voltage at the input of the voltage regulator circuit; and
   decreasing the regulation point of the voltage regulator circuit after a delay.

13. The method of claim 12, wherein increasing the regulation point of the voltage regulator circuit comprises closing a first switch coupled in parallel with at least one resistive element of a voltage divider coupled to an output of the voltage regulator circuit.

14. The method of claim 12, wherein increasing the regulation point of the voltage regulator circuit comprises adjusting a reference voltage for the voltage regulator circuit.

15. The method of claim 12, wherein the high input voltage event comprises a large input voltage noise/ripple event.

16. The method of claim 12, wherein the high input voltage event comprises a high input voltage level event.

17. The method of claim 12, further comprising:
   detecting the high input voltage event has ended; and
   disabling the voltage regulator circuit based on the detecting the high input voltage event has ended.

18. The method of claim 13, wherein decreasing the regulation point comprises opening the first switch coupled in parallel with the voltage divider.

19. The method of claim 13, wherein increasing the regulation point of the voltage regulator circuit further comprises:
   enabling a current sink coupled to the output of the voltage regulator circuit; or
   closing a second switch in series with the current sink to couple the current sink to the output of the voltage regulator circuit.

20. An apparatus for supplying power via multiple modes, comprising:
   means for supplying power via switching regulation;
   means for regulating a voltage from the means for supplying power;
   means for detecting a high input voltage event in the apparatus;
   means for enabling the means for regulating the voltage, based on the detection;
   means for temporarily increasing a regulation point of the means for regulating the voltage to be higher than the voltage from the means for supplying power; and
   means for decreasing the regulation point of the means for regulating the voltage, after a delay.

21. The apparatus of claim 20, further comprising means for dividing a voltage output from the means for regulating the voltage from the means for supplying power, wherein the means for temporarily increasing the regulation point comprises means for selectively shorting at least one element of the means for dividing.

22. The apparatus of claim 20, wherein the means for temporarily increasing the regulation point comprises means for adjusting a reference voltage for the means for regulating the voltage from the means for supplying power.

23. The apparatus of claim 20, wherein the high input voltage event comprises a large input voltage noise/ripple event.

24. The apparatus of claim 20, wherein the high input voltage event comprises a high input voltage level event.

25. The apparatus of claim 20, further comprising:
   means for detecting the high input voltage event has ended; and means for disabling the means for regulating the voltage, based on the detection that the high input voltage event has ended.

26. The apparatus of claim 21, wherein the means for decreasing the regulation point comprises the means for selectively shorting the at least one element of the means for dividing.

27. The apparatus of claim 21, wherein the means for temporarily increasing the regulation point of the means for regulating the voltage further comprises means for sinking a current from an output of the means for regulating the voltage.

* * * * *